United States Patent [19]

Willett et al.

[11] 4,364,910

[45] Dec. 21, 1982

[54] INTEGRATED FLUE GAS PROCESSING METHOD

[75] Inventors: Howard P. Willett, Darien; Even Bakke, Stamford, both of Conn.

[73] Assignee: Peabody Process Systems, Inc., Stamford, Conn.

[21] Appl. No.: 271,512

[22] Filed: Jun. 8, 1981

Related U.S. Application Data

[60] Division of Ser. No. 130,202, Mar. 13, 1980, Pat. No. 4,305,909, which is a continuation-in-part of Ser. No. 85,470, Oct. 17, 1979, abandoned.

[51] Int. Cl.$^3$ .............................................. C01B 17/00
[52] U.S. Cl. ............................................ 423/242; 55/8
[58] Field of Search .......... 423/242 A, 242 R, 244 A, 423/244 R; 55/8, 9, 10, 11

[56] References Cited

U.S. PATENT DOCUMENTS

| | | | |
|---|---|---|---|
| 3,785,119 | 1/1974 | McIlvaine | 423/242 |
| 3,929,968 | 12/1975 | Taub | 423/242 |
| 3,960,687 | 6/1942 | Bakke et al. | 423/242 |
| 4,026,992 | 5/1977 | Shiga et al. | 423/242 |

*Primary Examiner*—Earl C. Thomas
*Assistant Examiner*—Gregory A. Heller
*Attorney, Agent, or Firm*—St. Onge, Steward, Johnston & Reens

[57] ABSTRACT

A system and process for flue gas processing to remove both gaseous contaminants such as sulfur dioxide and particulate matter such as flyash integrates spray scrubbing apparatus and wet electrostatic precipitation apparatus and provides for the advantageous extraction and utilization of heat present in the flue gas which is being processed. The integrated system and process utilizes a spray scrubbing tower into which the flue gas is introduced and into which aqueous alkali slurry is introduced as spray for sulfur dioxide removal therein. The flue gas leaves the tower moisture laden and enters a wet electrostatic precipitator which includes a heat exchanger where flyash and entrained droplets in the flue gas are removed by electrostatic precipitation and heat is removed from the flue gas. The cleaned flue gas exits from the precipitator and discharges into a stack. The heat removed from the flue gas finds use in the system or otherwise in the steam generation plant. The wet electrostatic precipitator of the integrated system and process includes a portion constructed as a cross flow heat exchanger with flue gas saturated with water vapor moving vertically upwards inside tubes arranged in a staggered pattern and ambient air being pulled horizontally across the outside of those tubes to cool the tube walls and thereby remove heat from the flue gas and cause condensation of water vapor on the inside wall surfaces. The condensate washes the electrostatically collected flyash particles down from the inside tube walls. The heat that is extracted from the saturated flue gas in the wet electrostatic precipitator heat exchanger may be utilized in several different ways, including: (1) for flue gas reheat after the wet electrostatic precipitator; (2) for preheating of combustion air to the steam generator boiler; and, (3) for heating of buildings. The integrated flue gas processing system and process of this invention provides many advantages resulting in increased efficiency and improved economy of flue gas cleaning and wide application of use.

13 Claims, 6 Drawing Figures

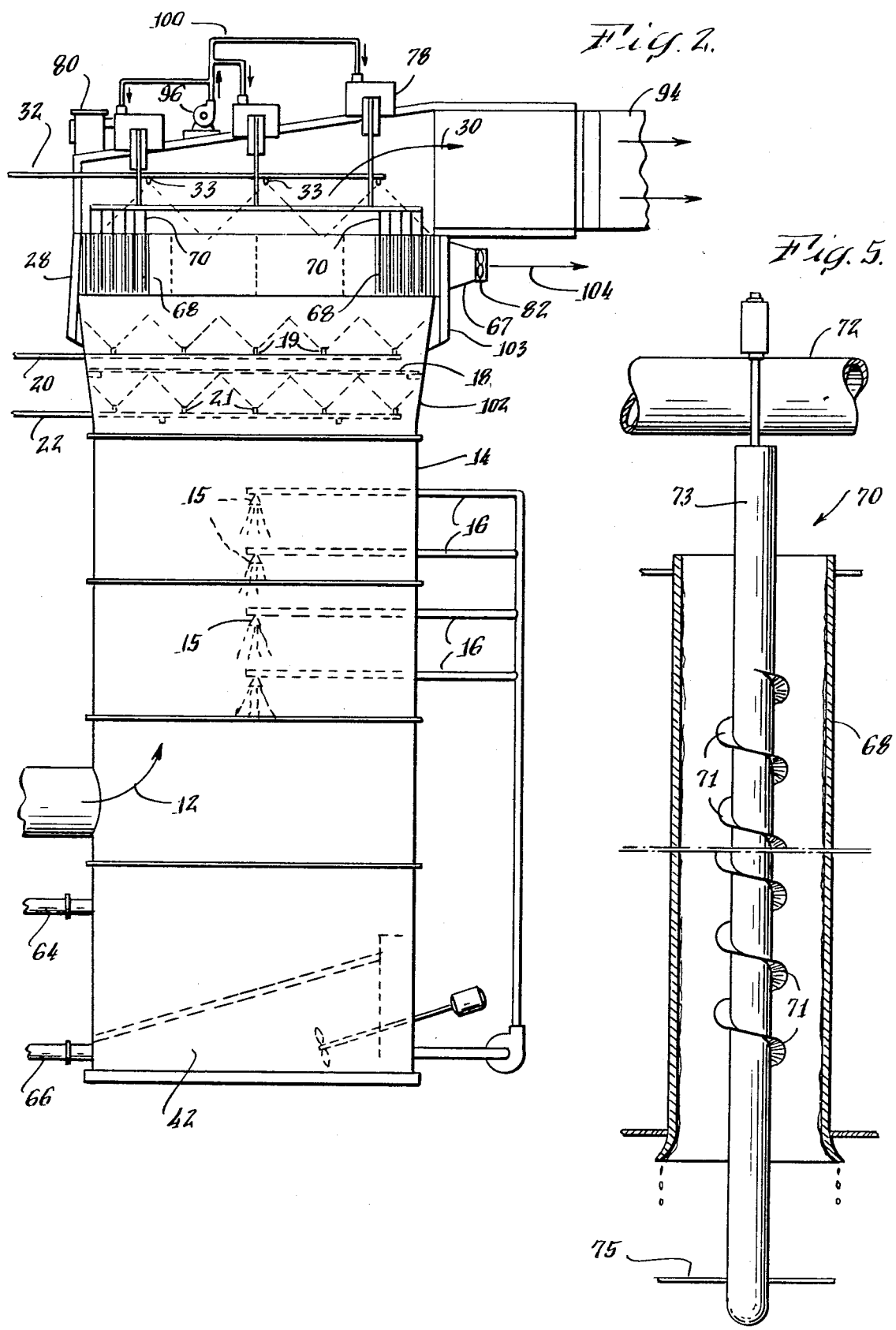

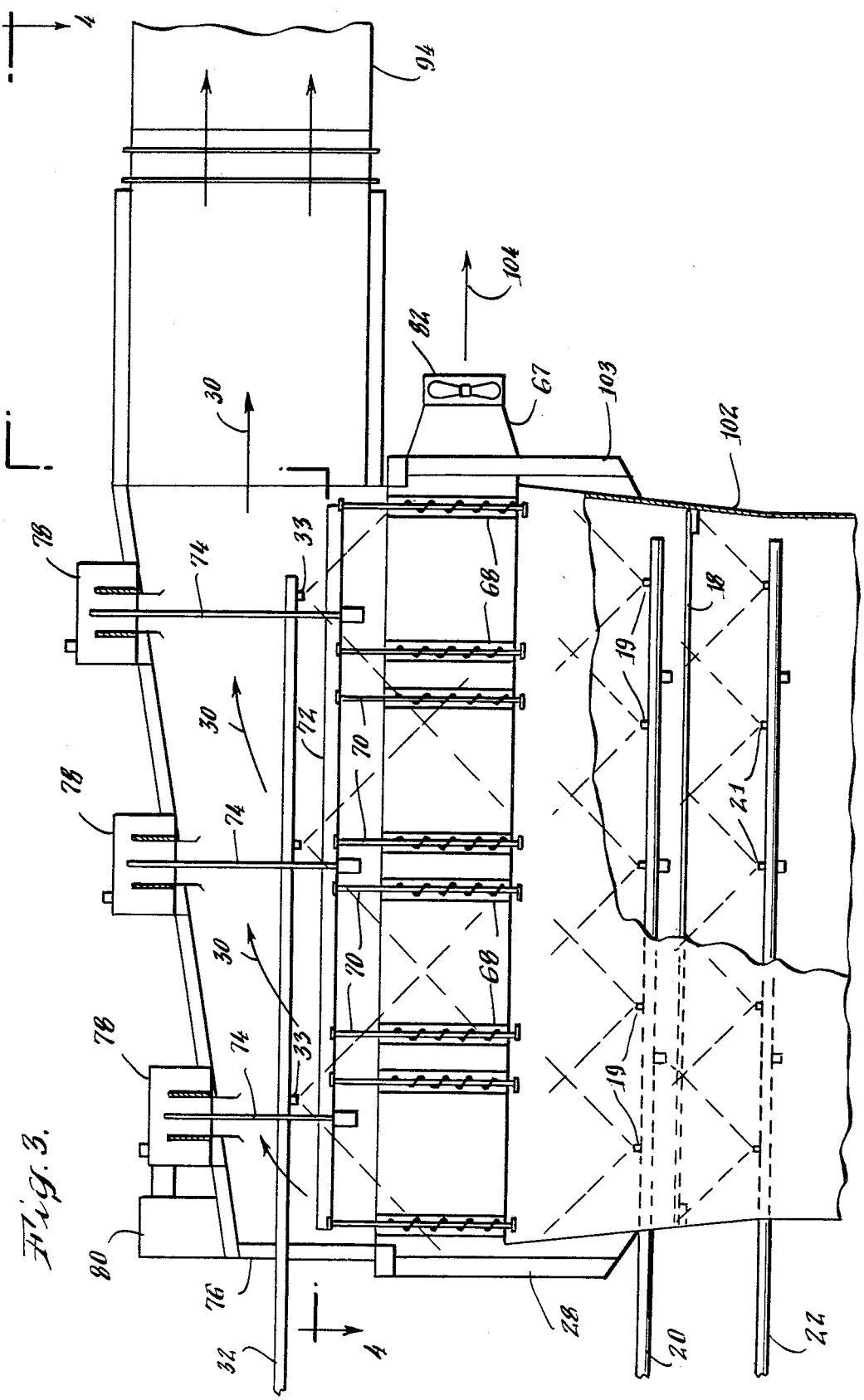

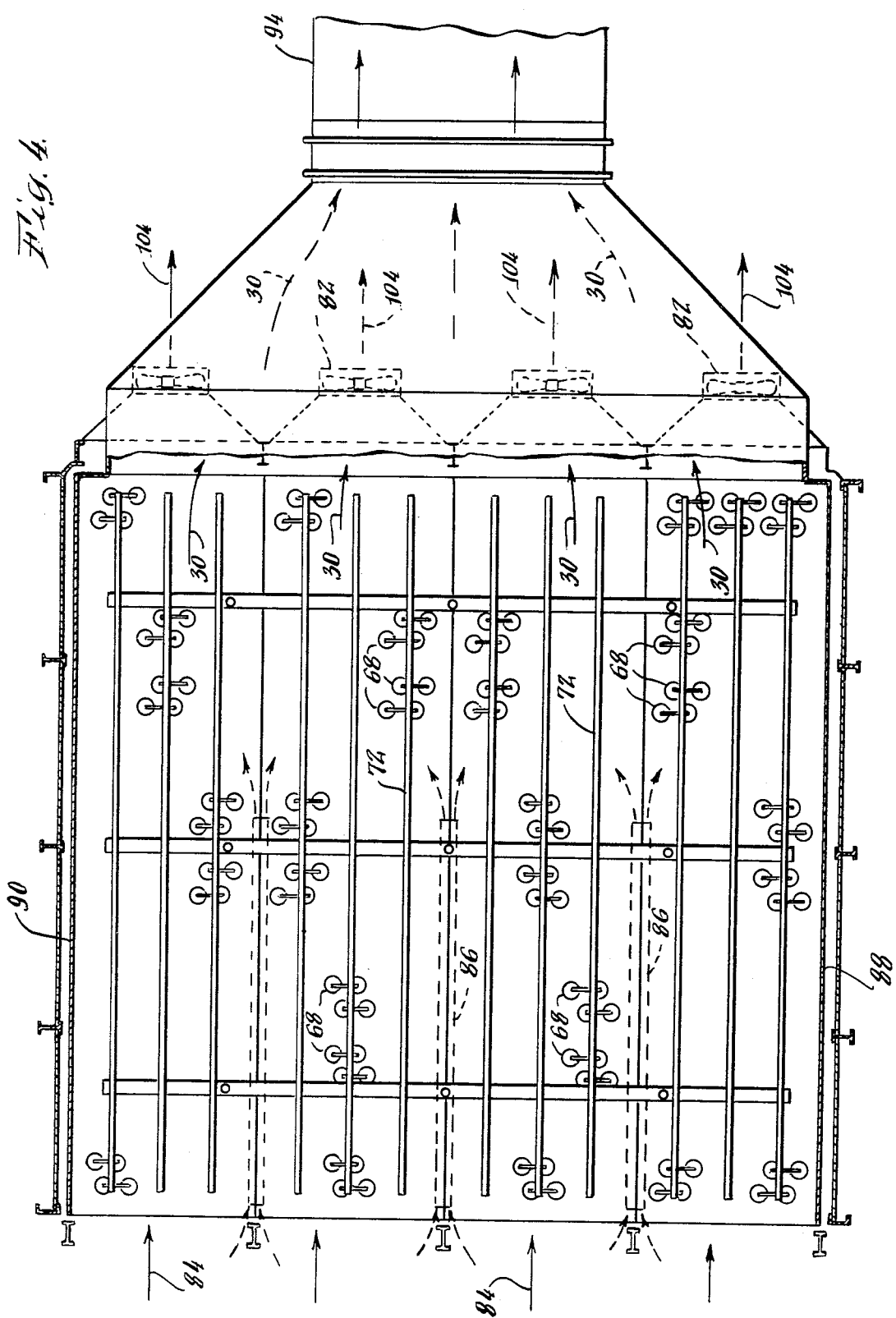

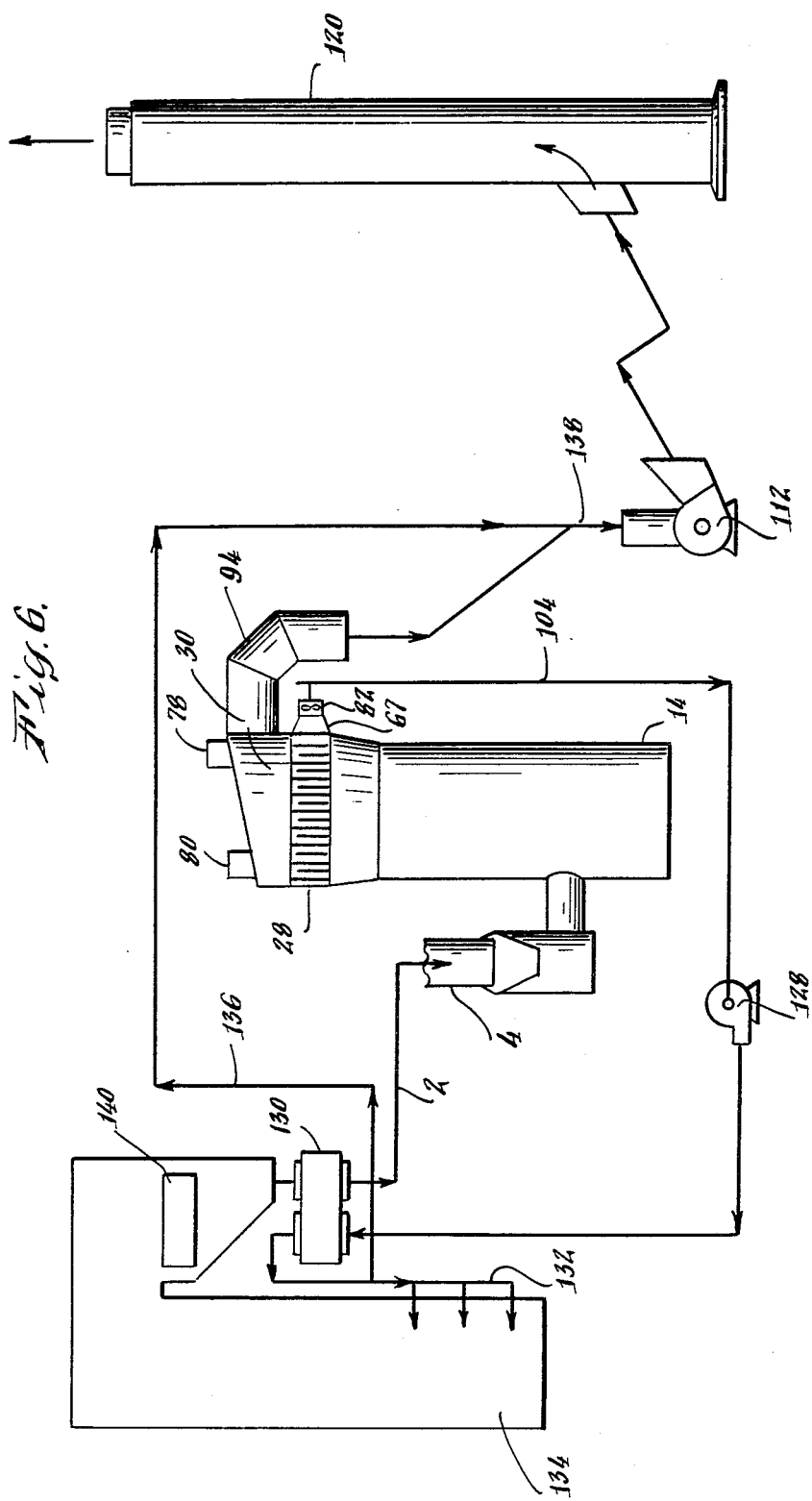

INTEGRATED FLUE GAS PROCESSING METHOD

This is a division of application Ser. No. 130,202 filed Mar. 13, 1980 now U.S. Pat. No. 4,305,909 issued Dec. 15, 1981 which is a continuation-in-part of application Ser. No. 085,470 filed Oct. 17, 1979, now abandoned.

BACKGROUND OF THE INVENTION

This invention relates to pollution control and particularly to a system and process for processing flue gas containing sulfur dioxide and flyash. More particularly, this invention relates to an integrated system for flue gas processing incorporating spray scrubbing apparatus utilizing alkali slurries for sulfur dioxide removal and wet electrostatic precipitation apparatus for flyash removal.

Spray scrubbers in which a lime or limestone slurry is recycled through an absorption tower for contact with the flue gas to be cleaned are well known. The sulfur dioxide in the flue gas is dissolved in the droplets of the sprayed slurry and reacts with the alkali ions therein to produce an insoluble solid precipitate. For example, in U.S. Pat. No. 3,907,526, assigned to the assignee of this application, the disclosure which is incorporated herein by reference, there is disclosed a high velocity spray scrubber in which a plurality of vertically spaced, downwardly directed nozzles within the scrubber spray slurry droplets into the scrubber space while the gas to be scrubbed moves upward relative to the downwardly moving droplets of scrubber slurry.

In the spray scrubbing tower disclosed in U.S. Pat. No. 3,907,526, a wash tray is disposed between the upper end of the internal scrubbing space and the outlet of the scrubber, over which a layer of water flows for removing entrained droplets and particulates from the gas while an upwardly directed spray head is disposed beneath the wash tray to spray water onto the underside of the wash tray to prevent the formation of mineral deposits. The purpose of the wash tray is to remove entrained droplets of scrubber liquor and dust particles from the scrubbed gas. Disposed above the wash tray in the scrubber is a conventional mist eliminator for removing entrained droplets of spray liquor prior to exiting of the scrubbed gas from the scrubber.

It is also known to utilize the flyash present in the flue gas to be processed as a source of alkali by collecting the flyash, by use of either an electrostatic precipitator or a filter bag house or a venturi scrubber, as the flue gas leaves the boiler, removing alkali therefrom and using the alkali in place of lime or limestone in the scrubbing slurry. Such a process is disclosed in copending U.S. patent application Ser. No. 018,291, filed Mar. 6, 1979, assigned to the assignee of this application, the disclosure of which is incorporated herein by reference.

In the removal of particles from gas streams by electrostatic precipitation, the particle containing gas stream flows between grounded collection surfaces and corona discharge electrodes which produce ions in an electrostatic field causing the particles to be charged and attracted to the collection surface. In wet electrostatic precipitation, a liquid stream flows over the collection electrode to wash the particles therefrom.

In U.S. Pat. No. 1,329,818 there is disclosed a wet electrostatic precipitator in which furnace gases containing dust are contacted with water or solution to saturate them with water vapor. The saturated gases pass to an electrical precipitator wherein the temperature of the gases is reduced sufficiently to cause condensation of some of the water vapor to form a stream of condensed liquid on collecting electrodes. The walls of the collecting electrodes are maintained cooler than the gasses passing therethrough, by circulation of external air assisted by blower means or by other suitable cooling means, to cause condensation of moisture thereon sufficient to form a continuous stream of film to continually wash away collected materials.

In copending U.S. patent application Ser. No. 033,811, filed Apr. 27, 1979, assigned to the assignee of this application, the disclosure of which is incorporated herein by reference, there is disclosed a method and apparatus for self-cleaning wet electrostatic precipitation in which the collection electrode surfaces comprise tubes, incorporated between parallel tube sheets, which define channels through which a particle containing moisture-laden gas stream flows while a heat exchange medium, such as air, flows between the tube sheets, around and over the surfaces of the tubes to cause their collection surfaces to function as partial condensers. Water vapor present in the moisture laden gas stream condenses on the tube collection surfaces to continually flush them and prevent precipitated solids build-up.

It is stated in application Ser. No. 033,811 that such a system finds advantageous use together with conventional flue gas scrubbing apparatus in that down flowing condensate contacts up flowing gas and aids in the removal of gaseous contaminants such as sulfur dioxide in the flue gas. Moreover, the condensate has the quality of distilled water and is drained to equipment surfaces below to significantly reduce scaling tendencies. Since the condensed moisture is circulated through the system for reuse, the amount of water required for wet electrostatic precipitation is reduced and the amount of spray for the electrode surfaces can be reduced or eliminated entirely due to condensate flushing. Also, mist present in the gas downstream of the electrostatic precipitator decreases so that the amount of water lost by evaporation into the atmosphere is reduced.

Thus, there have been many and varied approaches to the processing of flue gas to remove gaseous contaminants such as sulfur dioxide and particulate matter such as flyash. However, these prior art attempts have focused largely on improving specific apparatus components or method steps which form but a part of the overall system and processing requirements for flue gas cleaning. Thus, there exists the need for additional and improved techniques which improve efficiency and economy in flue gas processing so that legislated emission requirements for steam generator operations can be met under varying operating conditions with greater efficiency in power utilization and the production of ecologically acceptable waste and/or other byproducts.

The present invention improves the efficiency and economy of known apparatus and methods for flue gas processing utilizing spray scrubbing and/or wet electrostatic precipitation and provides advantages not previously obtained.

SUMMARY OF THE INVENTION

This invention results in increased efficiency of flue gas processing to remove sulfur dioxide and flyash together with improved economy of operation through the provision of an improved system and process which integrates spray scrubbing apparatus and wet electrostatic precipitation apparatus and provides means for the advantageous extraction and utilization of heat present in the flue gas which is being processed. The integrated system and process according to this invention utilizes a spray scrubbing tower into which the flue gas is introduced and into which aqueous alkali slurry is introduced as spray for sulfur dioxide removal therein.

The flue gas in the tower passes through an interface tray, where chemically active, entrained alkali slurry droplets are diluted, after which the flue gas being cleaned, now moisture laden, enters a wet electrostatic precipitator which includes a heat exchanger. Remaining flyash in the flue gas is removed to a high degree by the electrostatic charging and collection process in the wet electrostatic precipitator while the collected flyash particles are washed down from the electrostatic precipitation collection surfaces and heat is removed from the moisture-laden flue gas. Entrained slurry droplets are also removed electrostatically and the flue gas exits from the top of the precipitator essentially free from suspended flyash particles and slurry droplets. The flue gas is then directed into a fan which discharges into a stack. The heat removed from the flue gas finds use in the system or otherwise in the steam generation plant.

The wet electrostatic precipitator of the integrated system and process of this invention includes a portion constructed as a cross flow heat exchanger with flue gas saturated with water vapor moving vertically upwards inside tubes arranged in a staggered pattern and ambient air being pulled horizontally across the outside of those tubes to cool the tube walls and thereby remove heat from the flue gas and cause condensation of water vapor on the inside wall surfaces. The condensate washes the electrostatically collected flyash particles down from the inside tube walls. The condensed water also reduces the required make-up rate which is needed for saturating the flue gas. The ambient air is pulled across the tubes by axial fans and the heat transfer is balanced across the heat exchanger by bringing in ambient air to the interior of the exchanger in ducts between tubes.

If desired, the hot flue gas can be first directed into a low pressure-drop quencher where enough slurry is introduced to saturate the flue gas with water vapor and remove coarse particles, that is, flyash particles larger than 2 microns in size. Since the integrated system and process of this invention removes flyash and sulfur dioxide in the same equipment, the alkalinity in the flyash is available for neutralization of the absorbed sulfur dioxide thus reducing the amount of alkali required. The system and process also permit operation in a closed loop mode wherein only evaporated water is replenished and the system pH is permitted to drop to solubilize certain cations which can act as a catalyst for liquid phase oxidation of sulfur dioxide to sulfuric acid.

The heat that is extracted from the saturated flue gas in the wet electrostatic precipitator heat exchanger may be utilized in several different ways, including: (1) for flue gas reheat after the wet electrostatic precipitator; (2) for preheating of combustion air to the steam generator boiler; and, (3) for heating of buildings.

The integrated flue gas processing system and process of this invention provides several advantages including: (1) flyash removal efficiency is independent of the dust resistivity or sulfur content in the coal thus providing significant fuel flexibility; (2) ground space requirements for the integrated system are no greater than similar requirements for a scrubber spray tower alone; (3) pressure drop through the system is approximately the same as for a scrubber spray tower alone; (4) sulfur dioxide absorption is accomplished using conventional lime or limestone technology in addition to utilizing the alkalinity in the flyash when sufficient and if desired; (5) the system and process provide means of disposing of all the flyash produced by the boiler, without the need for expensive dry blending equipment and fugitive dust collection systems; (6) the method and system may operate on a closed loop water balance with water leaving the system only in the final sludge or outlet gas stream so that no water treating facilities are required; (7) final disposal products can be blended with flyash and highly oxidized and will dewater regularly to produce a stable, ecologically acceptable land fill material; (8) only low quality plant water need be consumed, such as cooling tower blowdown, the disposal of which might otherwise require extensive and costly treatment facilities; (9) high through-put flue gas velocities are possible with removal of nearly 100 percent of the entrained mist; (10) high level performance at low power consumption is possible with flyash removal efficiency and demisting increasing as the boiler load is reduced; and, (11) warm air is produced which can be used for heating of buildings, preheating of combustion air or heating of air for flue gas reheat, all of which provide significant energy savings.

Thus, an object of this invention is the provision of an integrated system and process for processing flue gas to remove gaseous contaminants such as sulfur dioxide and particulate matter such as flyash.

A further object of this invention is the provision of an integrated system and process for processing of flue gas containing sulfur dioxide and flyash in which a wet electrostatic precipitator is integrated with a scrubber spray tower to remove both sulfur dioxide and the particulate matter with the recovery of heat from the flue gas by providing the wet electrostatic precipitator with a heat exchanger.

A yet further object of this invention is the provision of a system and process for flue gas processing which integrates the components and steps for sulfur dioxide and flyash removal to result in increased efficiency and economy of operation and more widespread application to various coal fuels.

The foregoing and other objects, features and advantages of this invention will be further apparent from the following detailed description of preferred embodiments thereof taken in conjunction with the accompanying drawings.

BRIEF DESCRIPTION OF THE DRAWINGS

FIG. 2 is a schematic elevation view, partially in section, of a scrubber spray tower and heat-exchanging wet electrostatic precipitator integrated therewith according to an embodiment of this invention;

FIG. 3 is a detailed view, partially in section, of the heat-exchanging wet electrostatic precipitator shown in FIG. 3;

FIG. 4 is a detailed plan view of the heat-exchanger portion of the wet electrostatic precipitator shown in FIG. 3;

FIG. 5 is an enlarged detail view of a discharge electrode and collection tube of the wet electrostatic precipitator shown in FIGS. 3 and 4; and, FIG. 6 is a schematic process flow diagram illustrating an integrated system and process for flue gas processing according to another embodiment of this invention.

DESCRIPTION OF THE PREFERRED EMBODIMENTS

System Description

Figure 1:
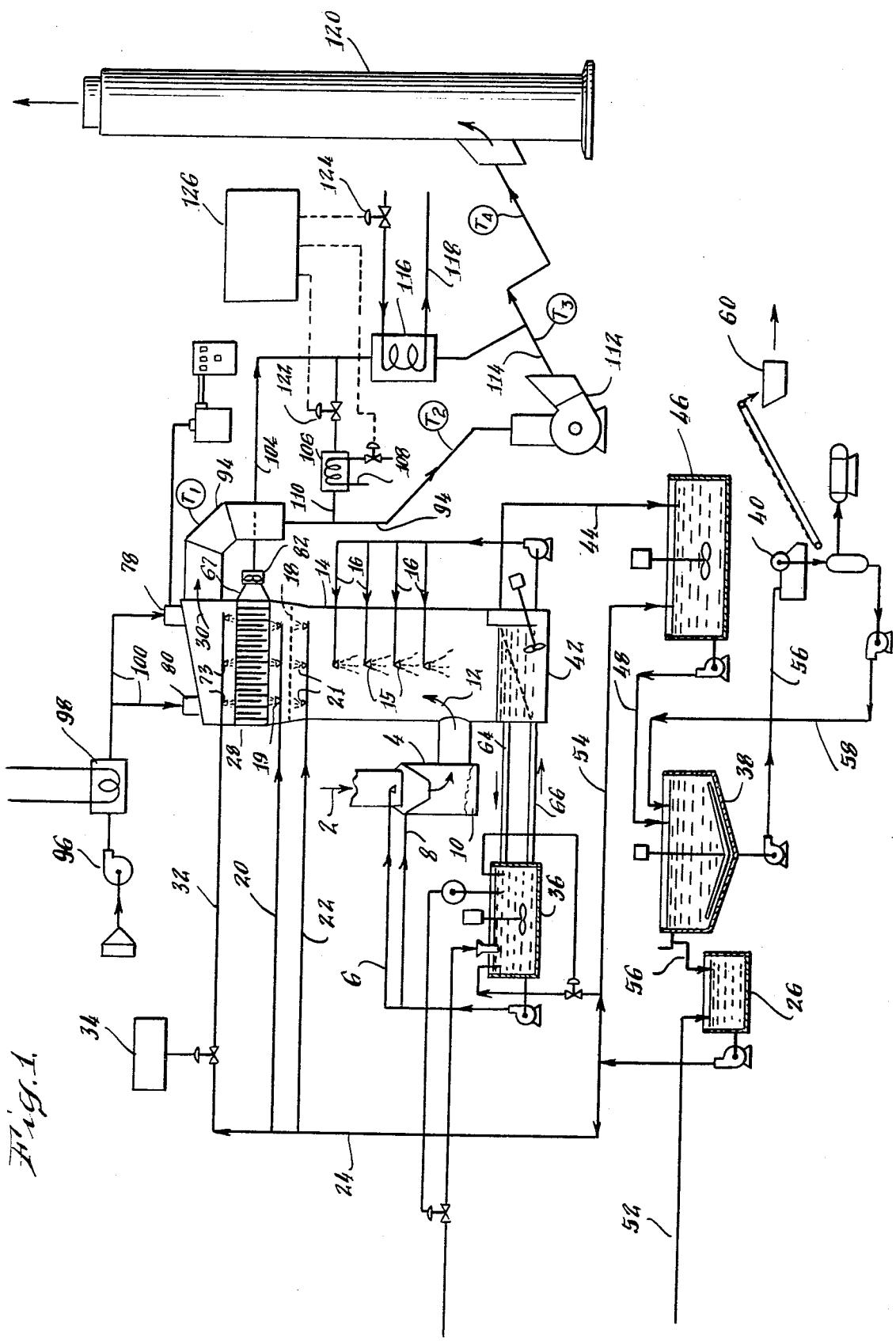
FIG. 1 is a schematic process flow diagram illustrating the integrated system and process for flue gas processing according to an embodiment of this invention.

The overall system and process of this invention can be best understood by reference to the process flow diagram, FIG. 1, which illustrates the components of an integrated system having increased efficiency and improved economy for flue gas processing to remove sulfur dioxide and flyash. Referring to FIG. 1, hot flue gas, typically at 300° F., represented by the arrow 2, is directed into a low pressure-drop quencher 4 where enough slurry is introduced through conduit means 6 and 8 in order to saturate the flue gas with water vapor and remove coarse particles which then collect at the bottom 10 of the quencher. By coarse particles are meant particles such as flyash particles larger than 2 microns in diameter. The quencher is constructed as a venturi scrubber with a so-called "wet elbow" to protect the lower part of the quencher vessel from being damaged by the abrasive flyash particles.

The saturated flue gas, represented by the arrow 12, enters the scrubber spray tower 14 which has banks of sprays, collectively referred to at 16, where the alkali slurry is introduced into the spray tower interior to remove sulfur dioxide from the flue gas. A more detailed illustration and description of such a spray tower is disclosed in U.S. Pat. No. 3,907,526.

The flue gas travels upward through the spray tower 14 past the spray heads 15 of the sprays 16 and through an interface tray 18. At the interface tray 18 the chemically active entrained slurry droplets are diluted by aqueous solution, namely unreactive light slurry fed through the spray heads 21 as tray wash from the conduit 22 leading from the conduit 24 which transfers light slurry from a thickener overflow tank 26. Spray heads 19 may spray the same light slurry, from conduit 20, above the interface tray 18 into the wet electrostatic precipitator 28. After passing the interface tray 18, the saturated gas enters the wet electrostatic precipitator 28 where the remaining flyash is removed to a high degree by the known electrostatic charging and collection process. The collected flyash particles, as described in greater detail hereafter, are washed down with water which condenses from the gas onto the wet electrostatic precipitator tube walls. Entrained slurry droplets are also removed electrostatically at this point and the flue gas exits from the top of the tubes of the wet electrostatic precipitator as represented by the arrow 30. The top of the wet electrostatic precipitator can be sprayed intermittently with unreactive light slurry from the thickener overflow 26 by sprays through spray heads 33 from the conduit 32 which may be regulated by the timer 34.

The slurry recirculation circuit includes a recycle tank 36 to provide sufficient delay time for the desupersaturation of dissolved sulfites and sulfates, a thickener 38 for settling of the slurry particles and a vacuum filter system, illustrated generally at 40, to further reduce the water content in the thickener underflow to produce filter cakes for disposal as sludge. The filter system could be replaced with a disposal pond if such is available at the particular site. Overflow from the slurry 42 located in the bottom of the spray tower 14 flows through conduit 44 to the waste slurry sump 46 from whence it is pumped to the thickener 38 through the conduit 48. The overflow from the thickener 38 flows through the conduit 50 to the overflow tank 26 for recycle as tray wash and intermittent spray to the wet electrostatic precipitator as previously described. Make-up water is fed through the conduit 52 to the overflow tank 26. Overflow from the tank 26 is also fed back to the waste slurry sump 46 through the conduit 54.

The thick slurry from the bottom of the thickener 38 enters the vacuum filter 40 by the conduit 56. Water removed from the vacuum filter 40 is returned to the thickener by the conduit 58 while the filter cakes are conveyed to the sludge bin 60 for disposal. Fresh alkali slurry is fed to the recycle tank 36 through the conduit 62. The slurry in the recycle tank 36 is recirculated with that in the bottom of the tower 14 by means of the conduits 64 and 66.

As seen in FIGS. 3 and 4, the tubular wet electrostatic precipitator is constructed with a cross flow heat exchanger, referred to generally at 67, with the flue gas saturated with water vapor moving vertically upward inside the grounded collection tubes 68 in which are located the discharge electrodes 70. An electrode support frame 72, supported by structural rods 74 carried on the electrostatic precipitator housing 76 by insulator connections in compartments 78, carry the discharge electrodes 70. The electrodes receive their power from the transformer/rectifier 80. The insulator compartments 78 are ventilated with heated air, from the blower fan 96, which is heated by the heater 98 and passes to the compartments 78 through the conduits 100 as shown in FIGS. 1 and 2. The wet electrostatic precipitator may be of the type described in copending application Ser. No. 033,811, filed Apr. 27, 1979, previously referred to herein.

Ambient air is pulled horizontally across the outside of the collection tubes 68 by means of the axial fans 82. This air cools the tube walls and causes condensation of water vapor on the inside wall surfaces which will wash down the electrostatically collected flyash particles from the inside tube walls. Referring to FIG. 4, it can be seen that the ambient air enters the wet electrostatic precipitator heat exchanger, as represented by the arrows 84, and is brought in to the interior of the heat exchanger in ducts 86 between the staggered collection tubes 68 to balance the heat transfer across the heat exchanger 67. For the same reason, ambient air is also pulled in along the two outer sides, 88 and 90, of the wet electrostatic precipitator heat exchanger.

After leaving the wet electrostatic precipitator, the flue gas, represented by the arrows 30, passes through the outlet conversion to duct 94.

The electrodes 70 may be of the spiral electrode type illustrated in FIG. 5 having screw flights 71 fastened to an electrode mast 73 secured at its bottom by tie rod 75 and which is described in greater detail in copending patent application Ser. No. 085,470 filed Oct. 17, 1979 and assigned to the assignees of this application, the disclosure of which is incorporated herein by reference. Such an electrode has a mast 73 having a diameter of from 0.25 to 0.40 times the diameter (D) of the collection tube 68 and is co-axially positioned in the collection tube. A helical discharge electrode in the form of a helical screw flight 71 is located on the mast 73. The helical discharge electrode has a substantially symmetrically curved outer edge, with the outer diameter (d) of the screw flight and mast being from 0.33 to 0.67 D, a pitch of from (D−d/2) to D−d, and the overall length (l) of the helical screw flight being from one screw revolution to L−(D−d); where L is the length of the collection tube 68. This results in a substantially symmetrical, high field strength and current density being created between the discharge electrode and the collector tube when high voltage is applied to the discharge electrode. Preferably, the helix terminates short of the ends of the collection tube at a distance greater than (D−d/2).

In the embodiment shown in FIGS. 2, 3 and 4, the wet electrostatic precipitator, although having a flue gas flow cross sectional area approximating that of the spray tower 18 so that the flue gas volume passing therethrough is approximately the same as that passing through the spray tower without appreciable change in velocity, is nevertheless of rectangular construction as shown in FIG. 4. Therefore, a conversion piece 102, shown in FIGS. 2 and 3, provides a connection between the round spray tower 18 and the rectangular wet electrostatic precipitator 28. The structural member 103 provides a tie-in between the wet electrostatic precipitator 28 and the conversion piece 102 of the tower 18.

The heat that is extracted from the saturated flue gas by the heat exchanger 67 of the wet electrostatic precipitator 28 can be utilized in several different ways, including: for flue gas reheat after the wet electrostatic precipitator; for preheating of combustion air to the boiler; and for heating of buildings.

FIG. 1 illustrates how the warm air from the wet electrostatic precipitator heat exchanger 67 may be used for reheating of the flue gas. The saturated flue gas exiting from the wet electrostatic precipitator has a temperature $T_1$. Warm air exiting from the axial fan 82 of the wet electrostatic precipitator heat exchanger 67, referred to generally at 104, enters a reheater 106 in which steam circulating in coils 108 therein reheats the air sufficiently so that when it exits the reheater at 110 and is injected into the flue gas duct 94 to mix with the flue gas it reheats the flue gas about 10 degrees higher than temperature $T_1$ to a temperature $T_2$.

The reheated flue gas enters a fan 112 at temperature $T_2$, the reheat to temperature $T_2$ ensuring that the gas entering the fan 112 is dry. Thus, the heat of compression produced by the fan 112 is used to reheat the flue gas further and not to evaporate water. Since the wet electrostatic precipitator operates as a high efficiency mist eliminator there will be very small amounts only of entrained water in the flue gas coming from the wet electrostatic precipitator making it possible to operate a dry fan with the small amount of reheat provided by the heated air 110.

The heat of compression in the fan 112 raises the temperature of the flue gas exiting therefrom, referred to generally at 114, to a temperature $T_3$. If further reheating of the flue gas is required, the warm air 104 from the wet electrostatic precipitator heat exchanger 67 may be heated in an optional reheater 116 by means of steam circulating in coils 118 therein and injected to mix with the flue gas at a location between the fan 112 and the stack 120 to produce a stack temperature $T_4$.

Since all the air used for reheat is clean air, the reheat temperatures may be easily controlled by dampers, such as 92, and steam control valves, such as 122 and 124, with a central temperature controller, indicated generally at 126, monitoring and controlling all temperatures for different ambient conditions in boiler loads. Such temperature controllers are known and available. Thus, maintenance problems usually associated with presently used reheat schemes, such as the type utilizing heat exchanger tubes in flue gas ducts, are completely avoided.

FIG. 6 illustrates how the warm air produced by the heat exchanger 67 can be used to preheat combustion air. In this embodiment, the warm air 104 from the wet electrostatic precipitator heat exchanger 67 is ducted to the inlet side of a forced draft boiler fan 128 to a boiler air preheater 130 and injected, at the locations referred to generally at 132, into the boiler 134. A portion of the preheated air, referred to at 136, is ducted to the discharge duct 94 of the wet electrostatic precipitator heat exchanger 67 where it is mixed with the saturated flue gas to produce a 10° F. reheat of the saturated flue gas which then enters the fan 112 at 138° F. Hot flue gas from the boiler economizer 140 is directed through the air preheater 130 to enter the quencher 4, as shown at 2, and proceeds through the spray tower 14 and wet electrostatic precipitator 28, in the same manner as described previously with respect to the embodiment of FIG. 1, where it exits as saturated flue gas, represented by the arrow 30, which is then reheated prior to entering the induced draft fan 112. The heat of compression of the fan 112 gives further reheat to the flue gas before it enters the stack 120.

Process Description

The hot flue has containing sulfur dioxide and particulates such as flyash enters the quencher/venturi where it is saturated and quenched from its inlet temperature by the action of sprays. On boilers with relatively low inlet loadings of flyash, for example, on coals with relatively low ash content, or downstream of an old electrostatic precipitator or mechanical collector, it would be sufficient to utilize a direct wet approach inlet into the spray tower rather than the quencher/venturi disclosed. Also, soot blowers may be positioned upstream of the inlet spray to remove possible buildup of flyash which might occur just upstream of the spray nozzles when the quencher/venturi approach is not employed.

The spray heads in the spray tower spray aqueous suspensions of calcium carbonate, calcium sulfite, calcium sulfate, and where flyash is also used as the alkali medium, flyash. The partially cleaned flue gas then passes through a perforated tray, referred to as the interface tray, which removes entrained process slurry.

The flue gas then enters the wet electrostatic precipitator where the stream of atmospheric charging of the particles causes the fine particulate matter and the entrained droplets to migrate to the tube walls. Since the flue gas entering the wet electrostatic precipitator is saturated with respect to water vapor and since the tubes are air cooled, condensation will occur on the inner surfaces which will flush these surfaces and keep them clean. Additional wash water may be provided. Since the collected particles are washed away in slurry form, the dust layer resistivity will be extremely low and will not enter into precipitator performance characteristics. Also, since the collected flyash particles are removed in slurry form, there is no dust reentrainment.

The flue gas velocity in the collection tubes is limited only by the required residence time for charging and collection and the velocity at which slurry droplets will penetrate through the tube and cause reentrainment of water droplets. Advantageously, this upper velocity is significantly higher than in a dry electrostatic precipitator.

Since the electrode is of the type previously described with a helical surface and effective large diameter high voltage characteristic, the electrostatic field is totally symmetric and it is possible to maintain high field strengths which will give an effective particle charging process, with a minimum of sparking.

Water droplets coming from the sprays below the tubes will keep the lower part of the electrodes and tubes clean. The droplets will also be charged in the electrostatic field and collected on the tube walls. The unit therefore operates with very high mist removal efficiency and the exiting gas is saturated with a minimal amount of entrained water.

As previously described, the saturated flue gas leaving the wet electrostatic precipitator may be reheated by directing the air, which has been warmed 40° to 50° F. above ambient, from the precipitator heat exchanger fan through a steam heat exchanger using low grade steam and then mixing it with the saturated flue gas to produce a reheat of 30°–40° F. Due to the excellent mist elimination in the wet electrostatic precipitator, and the preheating of the air through the tubes, the heat load on the exchanger will be significantly lower than on conventional spray tower systems. Also, because of the excellent demisting in the wet electrostatic precipitator, it is also feasible to operate with less reheat, such as 10°–20° F., and thereby save a significant amount of energy.

The process liquids fall to the base of the spray tower where most of the reaction between the sulfur dioxide and limestone occurs. The overall process comprises a complex set of individual chemical reactions, but the rate limiting step is the actual dissolution of the calcium carbonate from the solid into the liquid phase. The slurry which is removed by overflow from the recycle tank is collected in a waste slurry sump and pumped to a thickener and then to a vacuum filter and delivered for disposal as a filter cake containing about 80 percent solids. Make-up water, required by the closed loop water balance, may come from any convenient source in the plant such as cooling tower blowdown.

Design Example

The following is an example of the system and process performance. A steam generator having 130 MW electrical output capacity would produce approximately 600,000 acfm flue gas at 300° F. requiring processing. The flue gas is saturated to 523,000 acfm at 128° F. in the quencher.

Utilizing a wet electrostatic precipitator heat exchanger having 672 tubes, each of which is 12 inches in diameter and 7 feet 6 inches long, a total tube area of 15,834 sq. ft. is available for collection of the flyash particles and as condensation surface in the heat exchanger. This provides a socalled "specific collection area" in the wet electrostatic precipitator of 30.3 sq. ft./1,000 acfm.

With a maximum air velocity of 45 ft./sec. between the outside of two adjacent tubes, the overall heat transfer coefficient is 8.0 BTU/(sq. ft. hr. °F) and the pressure drop on the air side through the tube bank is 5 in. W.G. The total axial fan capacity required is 260,000 acfm or 65,000 acfm per fan as shown in FIG. 4. To increase the heat transfer area, fins may be added to the tubes. Adding 45 fins, having an outside diameter of 15 inches and spaced 2 inches apart per tube, the heat transfer coefficient, based on the inside tube area of 15,834 sq. ft. increases to 23.8 BTU/(sq. ft. hr. °F.).

Based on the foregoing heat transfer coefficients, the following values can be determined:

TABLE 1

|  | Inlet Temp. | $h_o$ | Outlet Temp. | Condensate | Percent Condensation |
|---|---|---|---|---|---|
| Tubes, no fins | 70° F. | 8.0 | 92° F. | 5,729 lbs/hr. | 3 |
| Tubes, with fins | 70° F. | 23.8 | 115° F. | 11,262 lbs/hr | 6 |

In the foregoing Table 1, the "Inlet Temperature" is the selected ambient temperature, "$h_o$" is the heat transfer coefficient, "Outlet Temperature" is the temperature of the air leaving the heat exchanger and "Condensate" is the amount of water vapor condensing on the inside of the tubes while "Percent Condensation" is the percentage of the water vapor in the flue gas which will condense to water.

From Table 1, it is apparent that one can desirably use the extended finned surfaces and accordingly the following determinations were made based on such a heat exchanger.

Without condensation, the required make-up rate of water lost to evaporation is 85,200 lbs/hr. With a condensation of 11,262 lbs/hr, the make-up rate is reduced to 73,938 lbs/hr or a make-up requirement reduction of 13.2 percent. Where make-up water is expensive this is an additional advantage of the present invention.

Based on the foregoing, heat extracted from the flue gas is 11,500,000 BTU/hr. using a small amount of the warm air from the wet electrostatic precipitator heat exchanger to reheat the flue gas 10° F. prior to entering the induced draft fan requires steam at 400° F. to heat up approximately 32,000 acfm from 115° F. to 300° F. This is based on an assumed saturation temperature of the flue gas of 128° F. ($T_1$) which, after reheat, is raised to 138° F. ($T_2$).

With a typical forced draft fan run at 25 inches W.G. and with a total flow rate of 565,000 acfm at 138° F. and a fan efficiency of 80 percent, the heat of compression causes a temperature rise of 14° F. so that the temperature of the flue gas out of the fan becomes 152° F. ($T_3$). Plotting the temperature values on a psychrometric chart shows that at a temperature of 152° F. out of the fan, the dew point temperature is slightly less than 128° F. so that the flue gas is 24° F. away from the dew point. This will be enough margin for maintaining the stack dry and thereby permit operation of a high velocity stack without condensing water vapor in the stack and reintrainment of water droplets.

If additional reheat is required due to local plant conditions, the remaining warm air at 115° F. from the wet electrostatic precipitator heat exchanger may be injected after the fan at 115° F. or by reheating it in the optional reheater to bring it up to a higher temperature. By injecting 115° F. air, the temperature of the flue gas becomes 140° F. ($T_4$) and, by reference to the psychrometric chart, this is still 24° F. away from the dew point. However, the temperature is lower and would result in less heat loss from the stack and, therefore, less chance of condensation. In order to obtain a greater difference in the stack temperature and dew point, the warm air at 115° F. may be heated to, for example, 152° F., in the optinal reheater. Plotting this on a psychrometric chart shows a dew point temperature of 118° F. so that the stack temperature is 34° F. away from saturation, a safe margin.

Utilizing reheat of combustion air, illustrated in FIG. 6, results in the following determination. Taking some of the 500° F. preheated combustion air and injecting it after the wet electrostatic precipitator, to produce a 10° F. reheat of the saturated flue gas, requires approximatelyy 25,000 acfm at 500° F. The flue gas temperature becomes 138° F. ($T_2$) while the flue gas temperature after the fan is 152° F. ($T_3$), as before. The heat removed from the boiler preheater combustion air is only 6,400,000 BTU/hr while the amount of air removed is only 3.3 percent of that required for combustion.

The warm air at 115° F. from the wet electrostatic precipitator heat exchanger is directed to the suction side of the forced draft fan and as shown above, would supply 11,500,000 BTU/hr to the system. This is approximately twice that removed for reheat, 6,400,000 BTU/hr. Therefore, this system and process enables approximately 20° F. reheat after the wet electrostatic precipitator without a net loss of heat in the system. The warm air from the wet electrostatic precipitator heat exchanger would provide 62 percent of the required combustion air.

Thus, there has been disclosed an improved system and process for processing flue gas to remove sulfur dioxide and flyash utilizing an integrated spray scrubber and wet electrostatic precipitator and the advantageous extraction and utilization of heat present in the saturated flue gas being processed to result in increased efficiency and improved economy of operation.

What is claimed is:

1. An integrated process for removing sulfur dioxide and flyash from flue gas comprising feeding flue gas to a scrubber-quencher, introducing aqueous slurry to the scrubber-quencher, saturating the flue gas with water vapor, removing coarse flyash particles from the flue gas in the scrubber-quencher, conducting the flue gas to a spray tower for upward flow therein, spraying alkali slurry into the flue gas within the tower to absorb and react with the sulfur dioxide therein, recirculating slurry containing absorbed sulfur dioxide to increase the residence time for the reaction of alkali and sulfur dioxide, removing slurry containing reaction products of alkali and sulfur dioxide and precipitated flyash from the tower, dewatering the slurry so removed to obtain a waste product, passing the flue gas through an interface tray located in the tower downstream of the alkali slurry spray, spraying the interface tray with an unreactive aqueous solution to substantially saturate the flue gas, passing the flue gas through a wet electrostatic precipitator located downstream of the spray tower, electrostatically precipitating flyash and entrained slurry droplets from the flue gas, removing heat from the saturated flue gas passing through the wet electrostatic precipitator by causing ambient air to flow across the outside of precipitation tubes through which the flue gas passes, heating the flowing ambient air, cooling the precipitation tube walls, causing condensation of water vapor in the flue gas on the tube walls, conducting the heated flowing ambient air away from the precipitator and utilizing the heat therein.

2. An integrated process for removing sulfur dioxide and flyash from flue gas as claimed in claim 1 wherein the utilization of the heat in the heated ambient air comprises mixing the air with the flue gas leaving the wet electrostatic precipitator and heating the flue gas.

3. An integrated process for removing sulfur dioxide and flyash from flue gas as claimed in claim 2 wherein the utilization of the heat in the heated ambient air comprises mixing at least part of the air with combustion air for the boiler furnace the flue gas of which is being processed and heating the combustion air.

4. an integrated process for removing sulfur dioxide and flyash from flue gas as claimed in claim 3 wherein the utilization of the heat in the heated ambient air further comprises mixing at least a portion of the air with the flue gas leaving the wet electrostatic precipitator and heating the flue gas.

5. An integrated process for removing sulfur dioxide and flyash from flue gas as claimed in claim 2, 3 or 4 further comprising further heating the heated ambient air prior to utilizing it.

6. An integrated process for removing sulfur dioxide and flyash from flue gas as claimed in claim 1 further comprising producing a totally symmetric electrostatic field when electrostatically precipitating the flyash and entrained slurry droplets from the flue gas.

7. An integrated process for processing hot flue gas in a processing system by removing both particulate material such as flyash and gaseous contaminants such as sulfur dioxide from the hot flue gas comprising feeding hot flue gas to a scrubbing tower for upward flow therein, spraying alkali slurry into the flue gas to react with sulfur dioxide therein, substantially saturating the flue gas passing the scrubbed flue gas to electrostatic precipitation means for precipitating flyash from the scrubbed flue gas, passing the scrubbed flue gas through a channel defined by discharge electrode means and collection electrode means in the electrostatic precipitator means, circulating air in a chamber located in proximity to the collection electrode means to heat the air and to remove heat from the flue gas passing through the channel between the discharge electrode means and collection electrode means to condense water on the collection electrode means, conducting the heated air to mixing means and mixing the heated air with one or more gas streams in the processing system to utilize the heat removed from the saturated flue gas within the processing system to contribute to heating of the gas stream with which the heated air is mixed.

8. The integrated process for processing hot flue gas as claimed in claim 7 wherein the air in the chamber cools the collection electrode means sufficiently to condense water vapor present in the scrubbed flue gas on the surface thereof to flush the collection electrode surface of particles precipitated thereon.

9. The integrated process for processing hot flue gas as claimed in claim 7 wherein the mixing with the heated air comprises mixing the heated air with the cleaned flue gas stream exiting from the wet electrostatic precipitator means for reheating it.

10. The integrated process for processing hot flue gas as claimed in claim 7 wherein the mixing with the heated air comprises mixing the heated air with combustion air fed to a boiler from which the flue gas emanates for preheating it.

11. The integrated process for processing hot flue gas as claimed in claim 10 further comprising further heating the mixed heated air and combustion air and conducting a portion of the thus heated mixed air stream and mixing it with the cleaned flue gas stream exiting from the wet electrostatic precipitator for reheating it.

12. The integrated process for processing hot flue gas as claimed in claim 7, 8, 9, 10 or 11 comprising a high strength electric field between the collection electrode means and the discharge electrode means; whereby a substantially symmetrical, high density current flow between the discharge electrode and the collection tube is created when high voltage is applied to the discharge electrode.

13. An integrated process for removing sulfur dioxide and flyash from hot flue gas comprising feeding hot flue gas from a boiler furnace to a venturi scrubber quencher, introducing aqueous slurry to the venturi scrubber quencher to saturate the flue gas with water vapor and remove coarse flyash particles from the flue gas, conducting the flue gas from the venturi scrubber quencher to a scrubbing tower for upward flow therein, spraying alkali slurry into the flue gas within the tower to absorb and react with the sulfur dioxide therein, collecting and recirculating slurry containing absorbed sulfur dioxide for use for alkali slurry spraying within the tank to increase the residence time for the reaction of alkali and sulfur dioxide, removing slurry containing reaction products of alkali and sulfur dioxide and precipitated flyash from the tower, dewatering the slurry so removed to obtain a waste product, spraying an interface tray means located downstream of the loation of alkali spraying with an unreactive aqueous solution to saturate the flue gas stream, directing the scrubbed flue gas to a wet electrostatic precipitator comprising a cross flow heat exchanger having collection electrode tubes through which the flue gas passes, the tubes being arranged between tube sheets, causing ambient air to flow across the outside of the tubes to remove heat from the flue gas and heat the flowing ambient air to cool the tube walls to cause condensation on the tube wall surfaces, conducting the heated flowing ambient air to mixing means and mixing at least part of the heated air with combustion air for the boiler furnace to preheat the combustion air, passing the mixed air stream through a preheater means, separating and conducting a portion of the further preheated mixed air stream to further mixing means and mixing it with the cleaned flue gas stream leaving the wet electrostatic precipitator to reheat it.

* * * * *